United States Patent
Graham

(10) Patent No.: US 10,446,280 B2
(45) Date of Patent: Oct. 15, 2019

(54) CONTROL ROOM FOR NUCLEAR POWER PLANT

(71) Applicant: BWXT mPower, Inc., Charlotte, NC (US)

(72) Inventor: Thomas G Graham, Lynchburg, VA (US)

(73) Assignee: BWXT mPower, Inc., Charlotte, NC (US)

(*) Notice: Subject to any disclaimer, the term of this patent is extended or adjusted under 35 U.S.C. 154(b) by 589 days.

(21) Appl. No.: 13/861,004

(22) Filed: Apr. 11, 2013

(65) Prior Publication Data

US 2013/0294560 A1    Nov. 7, 2013

Related U.S. Application Data

(60) Provisional application No. 61/625,740, filed on Apr. 18, 2012.

(51) Int. Cl.
*G21C 17/00* (2006.01)
*G21D 3/00* (2006.01)

(52) U.S. Cl.
CPC ............. *G21C 17/00* (2013.01); *G21D 3/00* (2013.01); *G21D 3/008* (2013.01); *Y02E 30/40* (2013.01)

(58) Field of Classification Search
CPC ........... G21C 17/00; G21D 3/00; G21D 3/008
(Continued)

(56) References Cited

U.S. PATENT DOCUMENTS

| 3,366,415 A | 1/1968 | Cooper |
| D247,183 S | 2/1978 | Cosentino |

(Continued)

FOREIGN PATENT DOCUMENTS

| EP | 0789290 | 8/1997 |
| WO | 1991/006960 | 5/1991 |
| WO | 2011/103652 | 9/2011 |

OTHER PUBLICATIONS

Yashavant Kanetkar, "Let Us C Solutions", Book, 2002, 4th eds. chapter 15, pp. 240-266. (Year: 2002).*

(Continued)

*Primary Examiner* — Jack W Keith
*Assistant Examiner* — Daniel Wasil
(74) *Attorney, Agent, or Firm* — Nelson Mullins Riley & Scarborough LLP

(57) ABSTRACT

A reactor control interface includes a home screen video display unit (VDU) displaying blocks representing functional components of a nuclear power plant and connecting arrows that connect blocks that are providing the current heat sinking path for the nuclear power plant. Directions of the connecting arrows represent the direction of heat flow along the current heat sinking path. If the current heat flow path of the plant changes, the connecting arrows are updated accordingly. Additional VDUs include: a mimic VDU displaying a mimic of a plant component; a procedures VDU displaying a stored procedure executable by the plant; a multi-trend VDU trending various plant data; and an alarms VDU displaying side-by-side alarms registries sorted by time and priority respectively. If a VDU fails, the displays are shifted to free up one VDU to present the display of the failed VDU, and one display is shifted to an additional VDU.

22 Claims, 10 Drawing Sheets

(58) Field of Classification Search
USPC .......................................................... 376/216
See application file for complete search history.

(56) References Cited

U.S. PATENT DOCUMENTS

| | | | |
|---|---|---|---|
| 5,227,121 A * | 7/1993 | Scarola | G21C 17/00 340/525 |
| 5,287,666 A | 2/1994 | Frascaroli et al. | |
| 5,906,079 A | 5/1999 | Brickner et al. | |
| 6,067,762 A | 5/2000 | Greer et al. | |
| 6,076,308 A | 6/2000 | Lyon et al. | |
| 6,163,740 A * | 12/2000 | Beltracchi | G05B 23/0272 700/108 |
| 6,276,102 B1 | 8/2001 | Shipman et al. | |
| 6,374,548 B1 | 4/2002 | Ruedinger et al. | |
| 6,415,555 B1 | 7/2002 | Montague | |
| 6,492,901 B1 | 12/2002 | Ridolfo | |
| 6,663,267 B2 | 12/2003 | Newhouse et al. | |
| D694,427 S | 11/2013 | Edkert et al. | |
| 8,776,445 B1 | 7/2014 | Jhaveri et al. | |
| 8,776,446 B1 | 7/2014 | Jhaveri et al. | |
| 2002/0011193 A1 | 1/2002 | Beck et al. | |
| 2002/0026755 A1 | 3/2002 | Jones | |
| 2003/0117440 A1 * | 6/2003 | Hellyar | G06F 3/0235 715/767 |
| 2004/0082334 A1 | 4/2004 | Petrick et al. | |
| 2004/0103593 A1 | 6/2004 | Beasley | |
| 2008/0035031 A1 | 2/2008 | Yamanishi et al. | |
| 2008/0104571 A1 * | 5/2008 | Jaeger | G06F 3/0481 717/113 |
| 2009/0000789 A1 | 1/2009 | Leuthen et al. | |
| 2009/0031181 A1 | 1/2009 | Yuan et al. | |
| 2009/0090076 A1 | 4/2009 | Abusada et al. | |
| 2009/0129530 A1 | 5/2009 | Reyes, Jr. et al. | |
| 2009/0217084 A1 * | 8/2009 | Ebbert | G06F 3/1454 714/5.1 |
| 2009/0293388 A1 | 12/2009 | Feldpausch et al. | |
| 2010/0024688 A1 | 2/2010 | Kitada et al. | |
| 2010/0141421 A1 * | 6/2010 | Lagnelov | G05B 23/0267 340/506 |
| 2010/0188263 A1 | 7/2010 | Cornwall et al. | |
| 2011/0126111 A1 | 5/2011 | Gill et al. | |
| 2011/0200158 A1 | 8/2011 | Hyde et al. | |
| 2012/0305203 A1 | 12/2012 | Verbeek et al. | |
| 2012/0311946 A1 | 12/2012 | Liu et al. | |
| 2013/0129030 A1 | 5/2013 | Hanada et al. | |
| 2014/0261100 A1 | 9/2014 | Henriott et al. | |
| 2014/0285720 A1 | 9/2014 | Epstein et al. | |

OTHER PUBLICATIONS

GE Hitachi Nuclear Energy, ANS 2010 Winter Meeting & Embedded Topical Meetings, PDW #1: Digital Instrumentation & Controls Workshop, Vendor Perspectives—GE Hitachi, by Richard E. Miller, Nov. 7, 2010.

2010 ANS Winter Meeting: "Nuclear Process!"; 7th Int'l Topical Meeting on Nuclear Plant Implementation, Control and Human Machine Interface Technologies (NPIC&HMIT 2010), New and Existing Plants I&C Design, Digital Instrumentation and Control Workshop, Las Vegas, NV, Nov. 7, 2010, by Sergey S. Anikanov, PhD, Westinghouse Electric Co.

NEI, Control Room Staffing for Small Reactors, Sep. 23, 2011.

International Search Report and Written Opinion for PCT/US2013/036271 dated May 16, 2014.

European Search Report dated Dec. 2, 2015 for EP Application No. 13825441.2.

Extended European Search Report dated Mar. 23, 2016 for EP Application No. 13825441.2.

Office Action dated Mar. 28, 2016 for Chinese Application No. 201380031761.7.

* cited by examiner

CONTROL ROOM FOR NUCLEAR POWER PLANT

This application claims the benefit of U.S. Provisional Application No. 61/625,740, filed Apr. 18, 2012. U.S. Provisional Application No. 61/625,740, filed Apr. 18, 2012, is hereby incorporated by reference in its entirety into the specification of this application.

BACKGROUND

The following relates to the nuclear reactor arts, nuclear power generation arts, nuclear reactor control arts, nuclear reactor human-machine interface (HMI) arts, and related arts.

Nuclear power plants are highly complex and include numerous systems to ensure safe operation. By way of illustrative example, a typical nuclear power plant employing a pressurized water reactor (PWR) includes: the nuclear reactor containing a nuclear reactor core comprising fissile material (e.g. $^{235}U$) immersed in primary coolant water and ancillary components such as a pressurizer and reactor coolant pumps (RCPs); a control rod drive system including control rods, control rod drive mechanisms (CRDMS) and ancillary components designed to insert neutron-absorbing control rods into the nuclear reactor core to extinguish the nuclear chain reaction (either during normal shutdown, e.g. for refueling, or in response to an abnormal condition, i.e. a scram); a steam generator in which primary coolant heats secondary coolant to generate steam; a turbine driven by the steam; an electric generator turned by the turbine to generate electricity; a complex switchyard providing the circuitry to couple the output of the generator to an external electric grid; a condenser for condensing the steam; piping with valving and ancillary components for conducting feedwater and steam between the various components; one or (typically) more house electrical systems for providing electrical power to the RCPs and other electrically driven components; backup power sources (typically diesel generators and batteries); an emergency core cooling system (ECCS) to dissipate residual heat still generated by the nuclear reactor core after shutdown of the chain reaction; ancillary cooling water systems supplying components such as the condenser; and so forth. A boiling water reactor (BWR) is similar, except that in a BWR primary coolant boils in the pressure vessel and directly drives the turbine. These numerous systems interact with one another. A malfunction of one component may trigger responses by other systems, and/or may call for the operator to perform certain operations in response to the malfunction.

Existing control rooms for nuclear power plants typically include a control panel for each component, sub-system, or other operational unit. The resulting layout is unwieldy, including numerous control panels with typically dozens of video display units (VDUs) along with additional indicator lights, and various operator controls such as touch-screen VDU interfaces along with switches, buttons, and so forth. The control panels are arranged to form a horseshoe-shaped arc of about 90° or larger, and inside of this arc further control panels are installed as bench boards. These vertical and bench-mounted control panels include readout displays, indicators, and controls for all components, valves, electrical switches, circuit breakers, piping, and so forth. The arced configuration enables an operator at the controls (OATC) to view all controls simultaneously or with a small turn to the left or right. Substantial effort has been expended in optimizing control room ergonomics, for example by placing the most critical and/or frequently used control panels near the center of the arc. The VDUs are typically designated as safety- or non-safety related, with usually around a dozen safety-related VDUs near the center of the arc or at centrally located bench boards, and the two dozen or more non-safety related VDUs distributed around the periphery.

Nonetheless, the control room is complex. A staff of five or more human operators is usually required around the clock. Response to a given situation may require accessing several control panels, which may be located at different places along the vertical arc and/or at different bench boards. When an abnormal situation arises, it typically results in numerous alarms being set off at various control panels associated with the various components affected by the abnormal situation. One (or possibly more) alarm indicates the "root cause" of the abnormal situation, while the other alarms indicate various automated responses to the root cause, consequent operational deviations, or additional problems triggered by the root cause. For example, a failure of the condenser will cause automated shutdown of the turbine, interrupts the steam flow, trips the reactor and brings the ECCS online; and, as further consequences reactor pressure and temperature likely will rise and various electrical systems may also react. Each of these events is unusual and generates an alarm, and this cascade of alarms occurs over a relatively short time interval, with some alarms activating almost simultaneously from the operators' point of view. The on-site human operators then confer to decipher the sequence of events that have led to these alarms, and agree upon appropriate remedial action. In making the diagnosis, operators may need to move around the control room to review various control panels. Yet, operator response should be swift to alleviate the abnormal situation. Any error in diagnosing the root cause may result in incorrect remedial action which can delay resolution of the root cause and may possibly introduce further problems.

Disclosed herein are improvements that provide various benefits that will become apparent to the skilled artisan upon reading the following.

BRIEF SUMMARY

In accordance with one aspect, a reactor control interface comprises a home screen video display unit (VDU) configured to display: blocks representing functional components of a nuclear power plant including at least (i) blocks representing functional components of a normal heat sinking path of the nuclear power plant and (ii) blocks representing functional components of at least one remedial heat sinking path of the nuclear power plant, and connecting arrows of a first type connecting blocks that are providing the current heat sinking path wherein directions of the connecting arrows of the first type represent the direction of heat flow along the current heat sinking path.

In accordance with another aspect, a method operates in conjunction with video display units (VDUs) of a reactor control interface wherein the VDUs include a group of safety VDUs and an additional VDU that is not a safety VDU. The method comprises: detecting a malfunctioning safety VDU, the remaining safety VDUs being functioning safety VDUs; shifting the displays of the functioning safety VDUs to free up one of the functioning safety VDUs wherein the shifting transfers the display of one of the functioning safety VDUs to the additional VDU that is not a safety VDU; and transferring the display of the malfunctioning safety VDU to the functioning safety VDU freed up by the shifting.

In accordance with another aspect, a non-transitory storage medium stores instructions executable by an electronic data processing device in communication with a video display unit (VDU) to perform a method comprising: displaying a home screen representing a nuclear power plant, the home screen including blocks representing functional components of the nuclear power plant including at least (i) blocks representing functional components of a normal heat sinking path of the nuclear power plant and (ii) blocks representing functional components of at least one remedial heat sinking path of the nuclear power plant, and connecting arrows of a first type connecting blocks that are providing the current heat sinking path wherein directions of the connecting arrows of the first type represent the direction of heat flow along the current heat sinking path; and in response to the nuclear power plant transitioning to a different heat sinking path, updating the connecting arrows of the first type by deleting and adding connecting arrows of the first type so that the updated connecting arrows of the first type represent the different heat sinking path.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
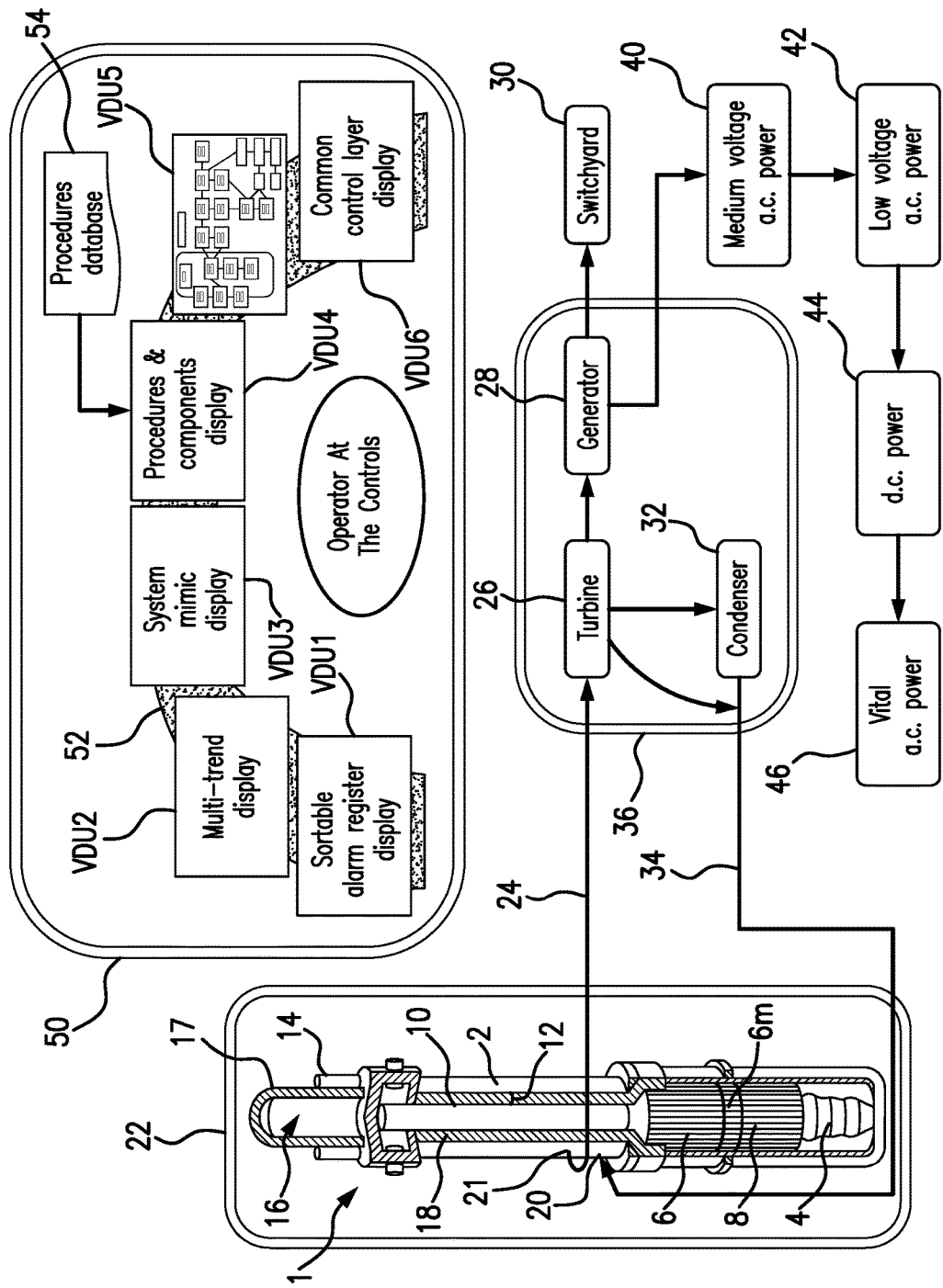
FIG. 1 diagrammatically shows a nuclear power plant and its control room including a set of monitoring and control video display units (VDUs).

Disclosed herein are improved control room designs that substantially enhance the effectiveness of the nuclear power plant operators.

In existing control rooms for nuclear power plants, a large number of VDUs (e.g. 30, 40, or even more VDUs) are employed in order to ensure that all relevant data are displayed at all times. However, it is recognized herein that the large number of VDUs can actually reduce operator effectiveness because it is not possible for the operator (or even a crew of five, six, or more operators) to monitor all VDUs simultaneously. Moreover, the large area over which this large number of VDUs must be distributed requires operators to move about the control room in order to view the various VDUs. In control room embodiments disclosed herein, this large multiplicity of VDUs is replaced by a smaller number of VDUs, e.g. about 5-7 VDUs.

To accomplish this, it is necessary to employ hidden windows. In other words, not all the information of the conventional 30, 40, or more VDUs can be displayed on the 5-7 VDUs of the disclosed control room embodiments. Nonetheless, all vital information must be displayed so that it is guaranteed that there is no possibility that the operator at the controls (OATC) will miss a safety-related event. To achieve this fail-safe display of all vital information, it is disclosed herein to provide a main display that focuses operator attention on the overriding concern of maintaining a safe heat sinking path for the nuclear reactor core. It is recognized herein that this single aspect of nuclear power plant operation captures all possible safety-related events.

In normal operation, the heat sinking path for a pressurized water reactor (PWR) is the following steam cycle (where "RCS" is "reactor coolant system", "PC" is "primary coolant", and "SC" is "secondary coolant"):

Nuclear core→RCS→SC feedwater→SC steam-→turbine→condenser where the condenser converts the secondary coolant steam back to secondary coolant feedwater while rejecting heat to circulating water. Heat is also rejected to the electric generator by action of the turbine—a portion of this heat is converted to electricity while the remainder is converted to heat in the generator. A small portion of heat is also rejected in the turbine itself, resulting in some steam condensation inside the turbine, and the condensate is also fed back to the secondary coolant feedwater system. The steam cycle of a boiling water reactor (BWR) is similar, except that there is no for steam generator and primary coolant boiled in the pressure vessel directly drives the turbine:

Nuclear core→RCS→PC steam→turbine→condenser

In any deviation from normal operation, a safe heat sinking path must be maintained. For example, if the primary coolant exceeds a safe threshold, the reactor scrams and the emergency core cooling system (ECCS) takes over to reject residual heat from the shut-down nuclear reactor to an ultimate heat sink (UHS) in the form of a large body of water, cooling tower, or so forth. Here the safe heat sinking path (for both PWR and BWR) is:

Nuclear core→RCS→ECCS→UHS

Note that here the heat being generated in the reactor core is not due to an operating nuclear chain reaction (that having been extinguished by the scram and possibly by other measures such as injection of soluble boron neutron poison), but rather is due to residual decay heat produced as short half-life reaction byproducts decay. As another example, in the case of a loss of coolant accident (LOCA) the reactor again scrams, and the safe heat sinking path for the residual decay heat is:

Nuclear core→RCS→Containment→ . . . →(UHS or ambient)

In this situation, the LOCA vents primary coolant steam into the containment. The containment prevents any radiological release. Some type of containment cooling system (indicated by the ellipsis " . . . " in the heat sinking path) transfers heat from containment to either the ultimate heat sink or to the ambient air (or both). This heat sinking path may operate in parallel with the heat sinking path through the ECCS.

In one nuclear reactor design currently under development (the B&W mPower™ small modular reactor) another contemplated safe heat sinking path employs an auxiliary condenser ("AUX"):

Nuclear core→RCS→Steam generator→AUX→ambient

In this design, the auxiliary condenser is located outside containment (e.g., a roof-mounted condenser) and is air-cooled by battery-operated fans. The auxiliary condenser is connected with the steam generator, which is internal to the pressure vessel in the mPower™ design (i.e., an integral PWR), so that it provides passive cooling using secondary coolant trapped in the steam generator when main feedwater and steam line valves are shut. In some event scenarios it is contemplated to employ this heat sinking path without scram. It is also contemplated to employ this heat sinking path in combination with heat sinking via the ECCS.

The disclosed control room embodiments employ a main or "home" display that is always maintained on a designated VDU. The home display is a functional display of the heat sinking path. The home display does not attempt to show individual valves or other details (although it is contemplated in some embodiments to include one or more principal valves, e.g. main steam and feedwater valves), but rather represents functional blocks. By way of illustrative example, the turbine system is suitably represented as a single block labeled "Turbine" (or another intuitive label). Similarly, the steam system (piping, valves, et cetera) conveying steam from the steam generator to the turbine is represented by a functional block labeled "Steam", without attempting to display individual pipes or valves. Any noteworthy excursion of the heat sinking path away from its normal operational envelope is highlighted on the home display by a distinctive color and/or another attention-grabbing visual effect (e.g., flashing, boldface, et cetera). This highlighting identifies the functional component that is in an abnormal condition. Components that perform a normal remedial response are highlighted in a different color (and/or other different visual effect) to emphasize that they have responded. In this way, the operator at the controls can immediately identify the root cause of the operational excursion, and can also readily recognize components that are responding normally to the excursion.

Additional VDUs of the disclosed control room embodiments provide additional information. In the illustrative embodiments, these additional VDUs provide alarm displays and trend displays. Further VDUs of the disclosed control room embodiments provide control capability. In the illustrative embodiments, these include a procedures/components display and a system mimic display. The procedures/components display enables operations at the procedure-level or component system level, and displays only those procedures that can be performed given the current operational state of the nuclear power plant. The system mimic display provides lower-level control of individual valves and so forth. These VDUs are optionally touch-sensitive or include a pointer-based user input device (e.g. mouse, trackpad, et cetera) and operatively interconnected so that, for example, by touching (or selecting via a mouse) the "Turbine" block on the VDU displaying home screen the turbine mimic is brought up on the mimic display.

Optionally, one or more further VDUs provide human-machine interfacing for non-safety related components and systems. In one embodiment, a "non-safety related" component or system is one in which any event occurring in that component or system cannot result in a safety-related operational excursion for at least one hour.

Because the disclosed control room embodiments rely upon only a few VDUs, failure of a VDU can be problematic. In some disclosed embodiments, this is addressed using a VDU-shifting scheme by which the display of the failed VDU is shifted to another VDU.

Starting with reference to FIG. 1, some illustrative embodiments are described. An illustrative nuclear reactor 1 is of the pressurized water reactor (PWR) type, and includes a pressure vessel 2 comprising an upper vessel and a lower vessel joined by a mid-flange. The pressure vessel 2 houses a nuclear reactor core 4 comprising fissile material, e.g. $^{235}$U immersed in primary coolant water. Reactivity control is provided by a control rods system that includes control rod drive mechanisms (CRDMs) 6 and control rod guide frame supports 8. The illustrative CRDMs 6 are internal CRDMs disposed inside the pressure vessel and including CRDM motors 6m disposed inside the pressure vessel; however, external CRDMs with motors mounted above the pressure vessel and connected via tubular pressure boundary extensions are also contemplated. The pressure vessel of the operating PWR contains circulating primary coolant water that flows upward through the nuclear reactor core 4 and through a cylindrical central riser 10, discharges at the top of the central riser 10 and flows back downward through a downcomer annulus 12 defined between the pressure vessel and the central riser to complete the primary coolant circuit. In the illustrative PWR, primary coolant circulation is driven by reactor coolant pumps (RCPs) 14 which may be located where illustrated in FIG. 1 or elsewhere; moreover, natural circulation or the use of internal RCPs disposed inside the pressure vessel is also contemplated. Pressure inside the pressure vessel of the illustrative PWR is maintained by heating or cooling a steam bubble disposed in an integral pressurizer volume 16 of an integral pressurizer 17; alternatively, an external pressurizer can be connected with the pressure vessel by piping. The illustrative PWR is an integral PWR in which a steam generator (or plurality of steam generators) 18 is disposed inside the pressure vessel, and specifically in the downcomer annulus 12 in the illustrative PWR; alternatively, an external steam generator can be employed. In the illustrative integral PWR, secondary coolant in the form of feedwater is input to the steam generator 18 via a feedwater inlet 20, and secondary coolant in the form of generated steam exits via a steam outlet 21. In the alternative case of an external steam generator, the ports 20, 21 would be replaced by primary coolant inlet and outlet ports feeding the external steam generator. The PWR 1 is disposed inside a primary containment 22, which is suitably a steel structure, steel-reinforced concrete structure, or the like.

With continuing reference to FIG. 1, the steam outlet 21 of the nuclear reactor delivers steam to a steam line 24 that drives a turbine 26 that turns an electric generator 28 so as to generate electricity that is delivered to an electrical switchyard 30 that feeds an electrical grid (not shown). Steam flows from the turbine 26 into a condenser 32 that condenses the steam to generate feedwater that is delivered by a feedwater line 34 to the feedwater inlet 20 of the steam generator 18 of the integral PWR so as to complete the steam cycle. Condensate generated inside the turbine 26 is also recaptured and added to the feedwater, as indicated by an arrow running from the turbine 26 to the feedwater line 34. The turbine 26, electric generator 28, and condenser 32 are typically housed inside a turbine building 36 (although in some embodiments the condenser may be mounted on top of the turbine building, and other variants are contemplated). In addition to feeding the switchyard 30, the electric generator 28 also delivers house electricity for running pumps, monitors, and other components of the nuclear reactor plant. In the diagrammatically illustrated BOP, the generator 28 feeds a medium voltage a.c. power system 40 which in turn powers a low voltage a.c. power system 42, which in turn powers a d.c. power system 44 that drives a vital a.c. power system 46.

It is to be understood that the illustrative nuclear power plant of FIG. 1 is an illustrative example. The disclosed nuclear power plant control room designs are suitably employed in conjunction with an integral PWR-based plant (as illustrated), or with a PWR-based plant employing an external generator, or with a boiling water reactor (BWR) based plant. In the case of a PWR with an external steam generator, the steam generator is typically housed inside containment with the pressure vessel so that the steam line 24 and contents of the turbine building 36 remain as illustrated. In the case of a BWR, there is no steam generator; instead, primary coolant boils inside the pressure vessel and is ported out the steam line. In the case of a BWR, the turbine and other steam-handling components are constructed to accommodate potential radioactive contaminants in the steam, which is primary coolant water in the BWR case.

With continuing reference to FIG. 1, the nuclear power plant is controlled via a control room 50. FIG. 1 is diagrammatic and does not show the actual physical layout of the nuclear power plant; however, in a typical embodiment a reactor building (not shown) houses the containment 22 (which in turn houses the PWR 1) and the control room 50, while the turbine building 36 is spatially separated by some distance, e.g. a few meters to a few tens or hundreds of meters. As the steam and feedwater lines 24, 34 run between containment 22 and the turbine building 36, keeping the separation relatively short reduces thermal losses in these lines. In the control room, an operator at the controls (OATC) is a human operator who performs control functions via a control station that includes six video display units VDU1, VDU2, VDU3, VDU4, VDU5, VDU6. The six video display units VDU1, VDU2, VDU3, VDU4, VDU5, VDU6 are suitably disposed on an arced table 52 or other arced support that partially encircles the OATC, so that the OATC has ready access to any of the six units.

VDU5 shows the home screen providing a functional diagram of the nuclear power plant that highlights the heat sinking path and operational status of functional blocks. VDU3 and VDU4 are control units that enable the operator to control systems of the power plant. VDU3 is the system mimic display and enables low level control of individual components, while VDU4 is a procedures and components display that enables initiation of procedures performed by systems or groups of systems. The procedures available to be performed are stored in a procedures database 54, and the procedures and components display shows only those available procedures that can be safely performed given the current operational state of the nuclear power plant.

VDU2 shows data trends. VDU1 is an alarm display, and in some embodiments sorts alarms by both time-of-occurrence and by priority. VDU6 is an optional unit that displays non-safety related subject matter. In some multiple-reactor nuclear power plants, VDU6 displays common control functions that are shared by both reactors. The subject matter displayed on VDU6 may be under control of someone other than the OATC; additionally or alternatively, if the OATC does control subject matter shown on VDU6 then this is lower priority subject matter.

Figure 2:
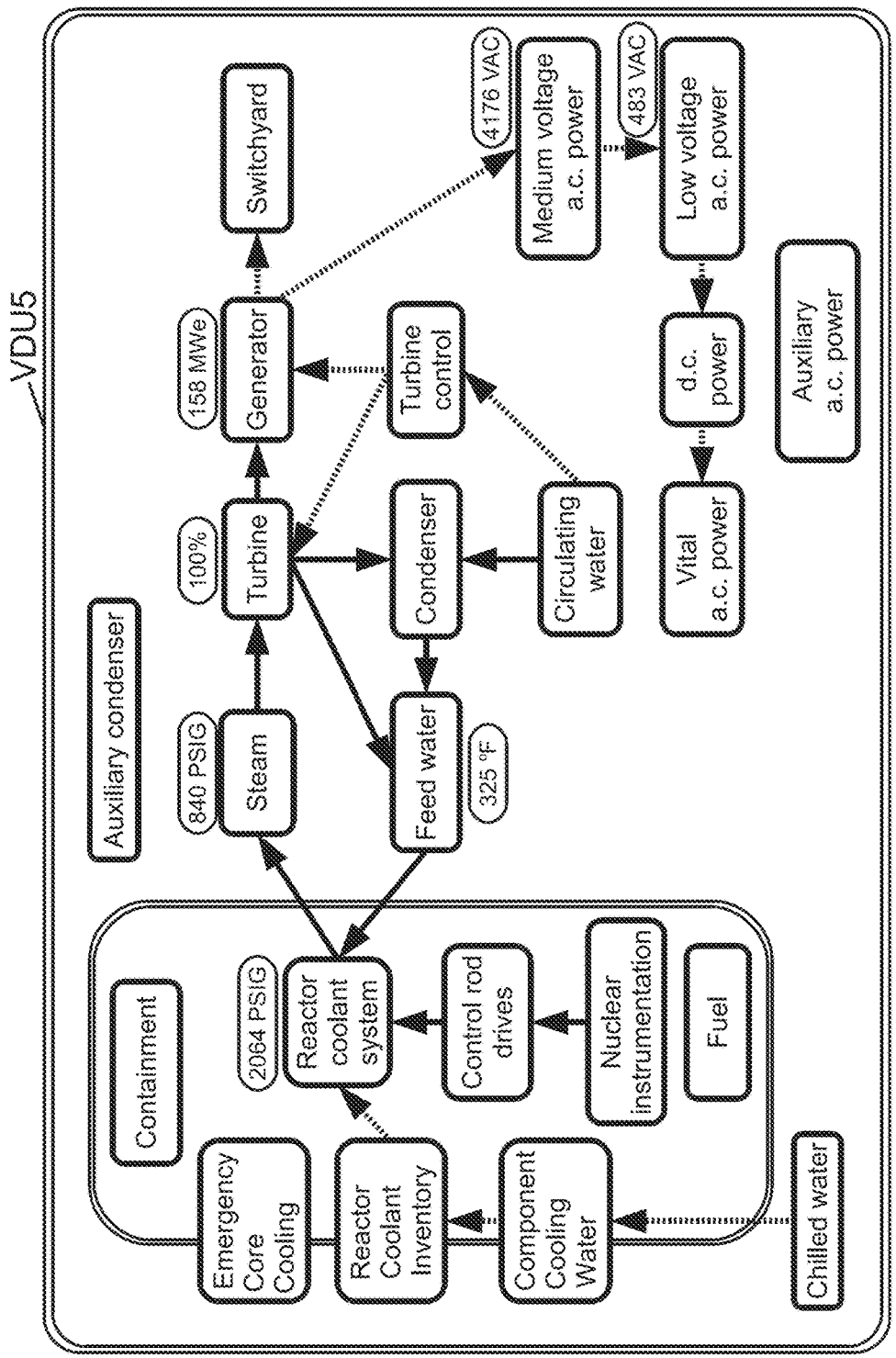
FIG. 2 shows the home screen displayed on VDU5 of FIG. 1 during normal operation.

With reference to FIG. 2, the home display shown in VDU5 is presented. Each functional system of the illustrative nuclear power plant of FIG. 1 is represented by a block or icon, e.g. a box with rounded corners in the illustrative home screen of FIG. 2. Thus (and comparing with FIG. 1), in the illustrative example: a block labeled "Fuel" represents the nuclear reactor core 1. A block labeled "Nuclear instrumentation" represents the in-core instruments (not shown in FIG. 1). A block labeled "Control rod drives" represents the complete control rod drives system including the illustrated CRDMs 6 with their motors 6m and the control rods and connecting elements, e.g., spiders, connecting rods (not shown in FIG. 1). A block labeled "Reactor coolant system" represents the reactor coolant system which includes the primary coolant water and its containing pressure vessel 2 along with ancillary components such as the RCPs 14 and the pressurizer 16, 17 that control flow and pressure of the primary coolant. A block labeled "Containment" represents the function of the containment 22. For mnemonic purposes, the containment 22 is also diagrammatically indicated in the home display, but this is optional. The block labeled "Containment" represents the containment in the functional sense, for example its role in the heat sinking path Nuclear core→RCS→Containment→ . . . →(UHS or ambient).

Further, a block labeled "Reactor coolant inventory" represents the Reactor coolant inventory and purification system (RCIPS) as a functional unit. A block labeled "Component cooling water" represents the functional system that provides component cooling water to the RCIPS and other components. A block labeled "Chilled water" represents the chilled water supply. A block labeled "Emergency Core Cooling" represents the emergency core cooling system (ECCS). (None of these components are shown in FIG. 1.)

With continuing reference to FIG. 2 and compared with FIG. 1, a block labeled "Turbine" represents the turbine 26 as a system. A block labeled "Steam" represents the functional system that generates and conveys steam from the nuclear reactor to the turbine. Thus, the block labeled "Steam" encompasses the steam generator 18, the steam pipe 24, and ancillary valves. A block labeled "Generator" represents the electrical generator 28. A block labeled "Condenser" represents the condenser 32. A block labeled "Switchyard" represents the switchyard 30. The electrical systems 40, 42, 44, 46 diagrammatically indicated in FIG. 1 are represented by corresponding blocks labeled "Medium voltage a.c. power", "Low voltage a.c. power", "d.c. power", and "vital power", respectively.

Additionally, the home screen of FIG. 2 includes a block labeled "Auxiliary a.c. power" that represents the diesel generators and/or batteries that provide emergency power if the generator 28 is not operating. The home screen of FIG. 2 further includes blocks labeled "circulating water" that represents circulating water that provides the cold water flow for the condenser 32, and a "Turbine control" block representing control systems that control the turbine 26 and generator 28. The home screen of FIG. 2 also includes a block labeled "Auxiliary condenser" representing the auxiliary generator (AUX) of the proposed mPower™ small modular reactor, including the condenser itself and associated cooling fans and control circuitry. (None of these components are shown in FIG. 1.)

It should be noted that the illustrative blocks of FIG. 2, which employ textual labels, could be otherwise labeled. For example, in some embodiments a system of three-letter acronyms is employed to label blocks of the home screen, e.g. "CND"="Condenser", "RCS"="Reactor coolant system", and so forth. It is also contemplated to employ representative symbolic icons, either instead of or in addition to textual or acronym labels.

The home screen displayed by VDU5 is a functional block diagram including the blocks representing functional systems as just described, along with arrows selectively connecting blocks. In the illustrative home screen, there are two types of connecting arrows: solid arrows and dotted arrows. The solid arrows represent the heat sinking path of the nuclear power plant in its current operational state. That is, the solid connecting arrows interconnect the displayed blocks that are providing the current heat sinking path, and the directions of the solid connecting arrows represent the direction of heat flow along the current heat sinking path The dotted arrows are optional, and if included indicate other connections between the displayed functional blocks. FIG. 2 shows the home screen during normal operation of the nuclear power plant of FIG. 1. (More generally, connecting arrows of a first type, e.g. solid connecting arrows, represent the current heat sinking path, and arrows of a second type (or of second and third types, et cetera), e.g. the dotted connecting arrows, connect blocks to represent other functional associations between functional blocks but do not represent the current heat sinking path.

The normal operational heat sinking path in the form of the steam cycle:

Nuclear core→RCS→SC feedwater→SC steam-
→turbine→condenser is represented by solid arrows in FIG. 2. Specifically, solid arrows from "Nuclear instrumentation" to "Control rod drives" and from "Control rod drives" to "Reactor coolant system" represents the path portion Nuclear core→RCS. Explicit inclusion of "Nuclear instrumentation" and "Control rod drives" in this path portion allows for the home screen to highlight abnormal operation of the reactor core, as indicated by the in-core instruments, or of the control rod drives which control reactivity of the core. In the home screen of FIG. 2, a solid arrow from "Reactor coolant system" to "Steam" represents the path portion RCS→SC feedwater→SC steam in which heat from the reactor coolant system boils secondary coolant feedwater in the steam generator 18. A solid arrow from "Steam" to "Turbine" and from "Turbine" to "Generator" represents the path portion SC steam→turbine in which the generated steam flows from the nuclear reactor 1 to the turbine 26 via the steam pipe 24. (The arrow from "Turbine" to "Generator" specifically denotes the rejection of heat to the generator 28 in this path portion). A solid arrow from "Turbine" to "Condenser" represents the path portion turbine condenser in which the steam flows from the turbine 26 to the condenser 32 where it is condensed back to form feedwater. An additional solid arrow in the home screen of FIG. 2 running directly from "Turbine" to "Feedwater" represents portion of steam that condense in the turbine 26 and is returned to the feedwater system.

With continuing reference to FIG. 2, the dotted connecting arrows indicate other operative connections between functional components that are not directly part of the heat sinking path. For example, the dotted arrows from "Generator" to "Switchyard" and from "Generator" to "Medium voltage a.c. power" denote distribution of the electricity produced by the electric generator 28. These functional connections are important and hence are shown on the home screen to inform the OATC that these connections are in effect, but they do not directly impact the heat sinking.

As also seen in FIG. 2, certain functional blocks include numeric annotations. For example, the "Reactor coolant system" block is annotated "2064 PSIG" indicating measured pressure of the primary coolant water in the pressure vessel 2. The "Steam" block includes the annotation "840 PSIG" indicating the measured steam pressure. The "Turbine" block is annotated "100%" indicating the turbine is presently running at 100% capacity. The "Generator" block is annotated with the present electrical power output level "158 MWe". The "Feedwater" block is annotated with the measured feedwater temperature "325° F.". The "Medium voltage a.c. power" and "Low voltage a.c. power" blocks are annotated with the current rms voltage levels "4176 VAC" and "483 VAC", respectively. By providing these annotations on the home screen, the OATC is immediately aware of these parameters which are indicative of the current state of the corresponding annotated functional blocks.

Figure 3:
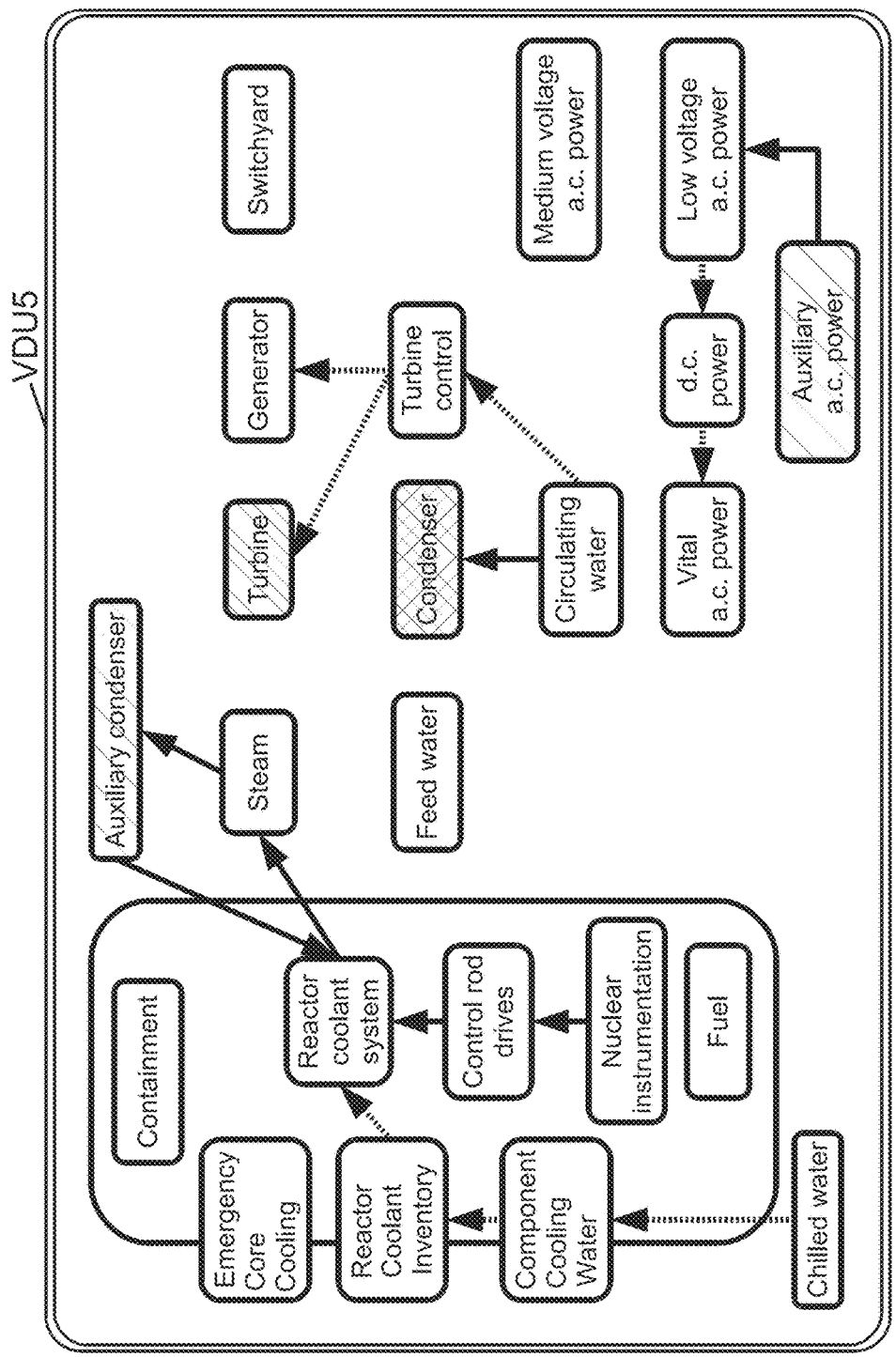
FIGS. 3-5 shows updates of the home screen of FIG. 2 during an abnormal event in which the condenser goes offline (FIG. 3), the reactor scrams (FIG. 4), and the emergency core cooling system comes online (FIG. 5).

With reference to FIG. 3, the home screen shown on VDU5 is presented after a failure of the condenser 32 and a consequential trip of the turbine 26 and shutoff of the electrical generator 28. The condenser is the root cause of this abnormal operating condition, and so the "Condenser" block is highlighted by a first highlighting format indicated in FIG. 3 by double-crosshatching. In practice, VDU5 is preferably a color display and the "Condenser" block is preferably highlighted in red, as red is an attention-grabbing color, although other colors and/or a flashing display are also contemplated. Thus, the OATC immediately knows that the root cause of the abnormal condition relates to the condenser 32, although the specific mechanism of the condenser failure is not apparent from the home screen. The "Turbine" block is shown with a different highlighting format, represented in FIG. 3 by single-crosshatching. This highlighting, which may in practice be a different color (e.g. green) indicates to the OATC that this component (the turbine 26) is in an abnormal operating condition, but that this abnormal operating condition was caused by something outside of the turbine 26 (namely, caused by the condenser failure in this example). Additionally, the illustrative reactor responds to this condition by bringing the auxiliary condenser online—accordingly, the "Auxiliary condenser" block is highlighted by yet another highlighting format (indicated by wide single-crosshatching in FIG. 3, but in practice preferably by yet another color, e.g. yellow). This third highlighting format informs the OATC that the component is performing a remedial action in accordance with its intended operation. The auxiliary condenser is not in an abnormal operating state, but the fact that it is operating is associated with an abnormal state. The "Auxiliary a.c. power" block is also highlighted by wide single-crosshatching, indicating powering of the fans of the auxiliary condenser system by auxiliary a.c. power (e.g. diesel generators and/or batteries). This highlighting informs the OATC that auxiliary a.c. power is active in accordance with its intended operation.

Moreover, the solid arrows have changed to indicate the new heatsinking path, namely Nuclear core→RCS→Steam generator→AUX→ambient. The solid arrows connecting to the "Turbine", "Condenser", and "Feedwater" lines are removed as these components are no longer part of the heat sinking path. The solid arrow connecting "Reactor coolant system" to "Steam" remains so as to indicate the RCS→Steam generator path portion which continues to operate, and new solid arrows are shown connecting the "Steam" block to the "Auxiliary condenser" block and connecting the "Auxiliary condenser" block to the "Reactor coolant system" block. These new arrows represent steam flow from the steam generator to the auxiliary condenser (where heat is rejected to atmosphere) and from the auxiliary condenser back to the steam generator (where it is reheated by the RCS).

The home screen of FIG. 3 informs the OATC that the condenser has failed (shown by double-crosshatching, e.g. red color, highlighting), and that the turbine has tripped (shown by single-crosshatching, e.g. green color, highlighting), and that the auxiliary condenser has been brought online (shown by wide single-crosshatching, e.g. yellow color, highlighting of both "Auxiliary condenser" and "Auxiliary a.c. power" blocks). Furthermore, the updated solid connecting arrows inform the OATC that a (new) safe heat sinking path is in operation, namely through the auxiliary condenser.

For simplicity, FIG. 3 does not include the block annotations shown in FIG. 2; however, they generally remain visible during abnormal operation. In the state shown in FIG. 3, if the auxiliary condenser is unable to provide adequate heat sinking then the pressure annotation of the "Reactor coolant system" block will begin rising reflecting a rising primary coolant pressure.

Figure 4:
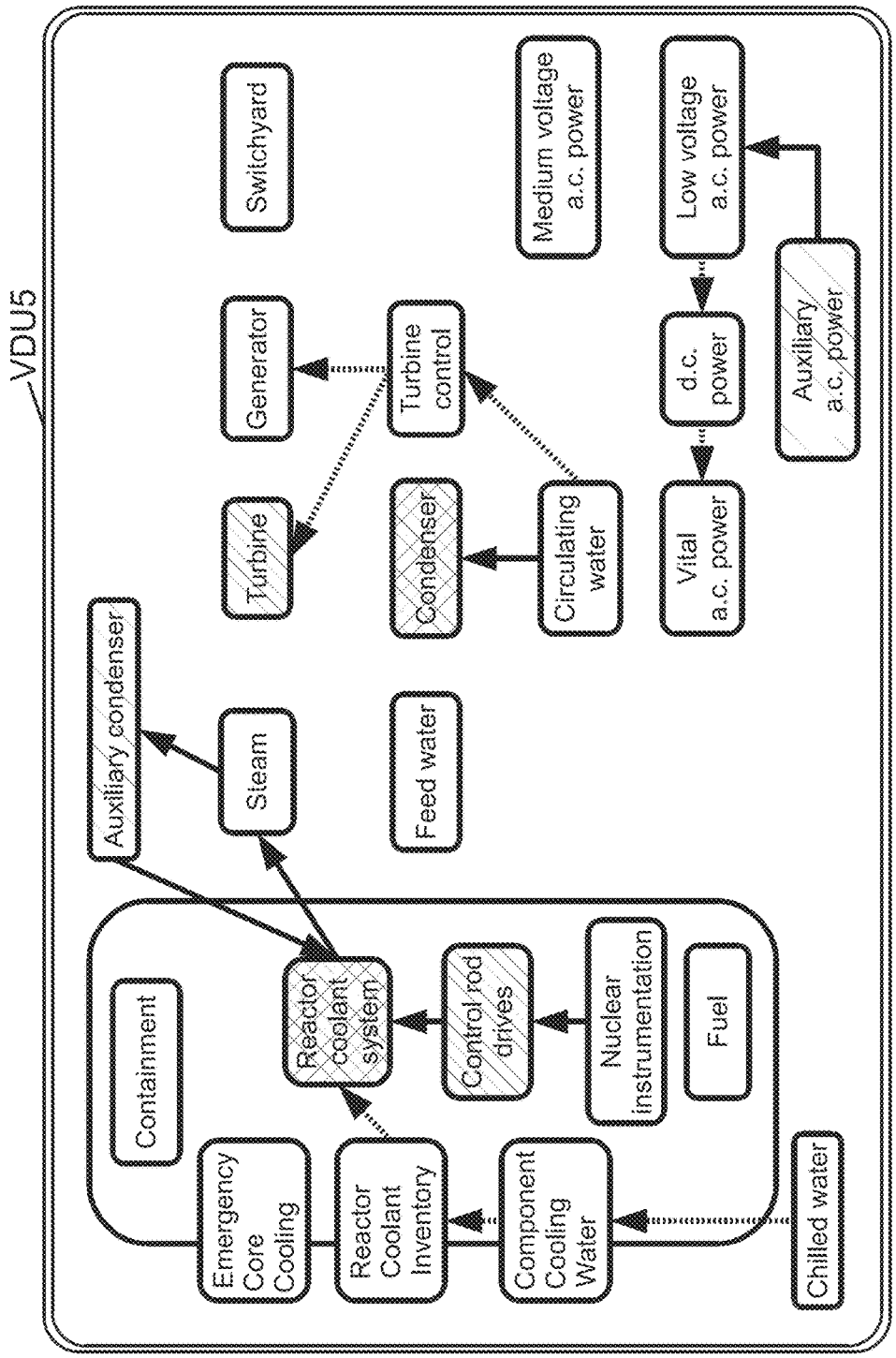

With reference to FIG. 4, the home screen is shown after the primary coolant pressure has risen above a first threshold. This pressure violation is indicated by applying the first highlighting format (double-crosshatching, e.g. red) to the "Reactor coolant system" block. Although this pressure violation is not technically a "root cause" of an abnormal state (the condenser failure is the root cause), it is not an expected consequence of the condenser failure. Rather, in some instances the auxiliary condenser will provide adequate heat sinking and the pressure violation will not occur. The fact that the pressure violation has occurred can therefore be thought of as a new or supplemental root cause—it leads to the expected response of scramming the reactor, i.e. dropping the control rods to extinguish the nuclear chain reaction. This is indicated in the home screen by coloring the "Control rod drives" block with the second highlighting effect (single crosshatching, e.g. green). In an alternative embodiment, the "Control rod drives" block is colored with the third highlighting (wide single-crosshatching, e.g. yellow) since the scram is a remedial action performed in accordance with its intended operation. However, since scram is something that it is desired that the OATC immediately notices, using the more aggressive second highlighting effect, as illustrated in FIG. 4, is advantageous.

In the illustrated response sequence, the scram does not immediately lead to bringing the ECCS online. In the illustrative reactor, it is hoped that by scramming and hence extinguishing the nuclear chain reaction, the auxiliary condenser may thereafter be able to handle rejection of the residual decay heat, so that the ECCS may not need to be brought online. However, if the auxiliary condenser is not able to keep up with the residual decay heat, then the primary coolant pressure will continue to rise in the state shown in FIG. 4.

Figure 5:
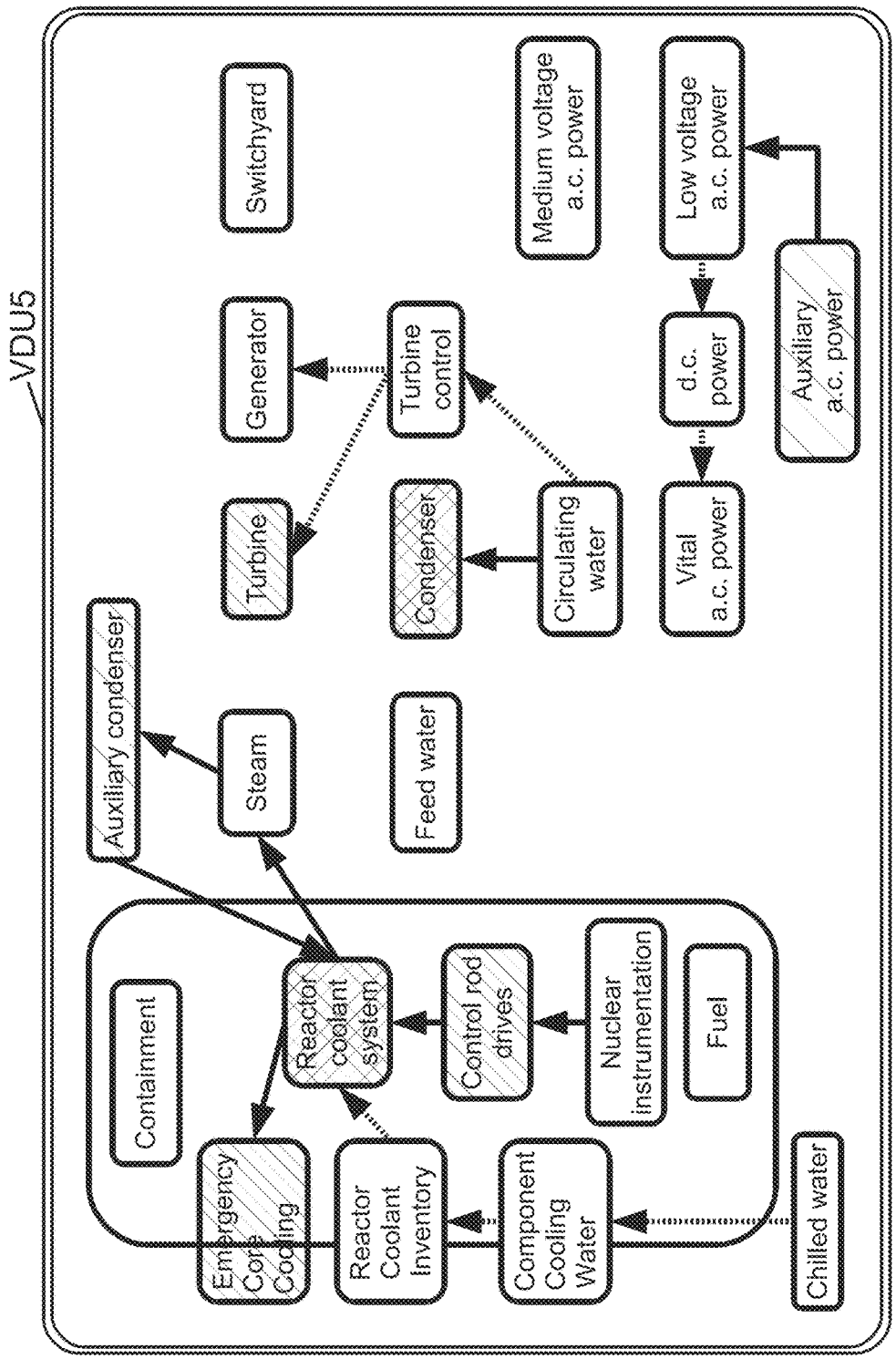

With reference to FIG. 5, the home screen is shown after the continually rising primary coolant pressure has risen above a second threshold that is higher than the first threshold. This pressure violation is "supplemental" to the violation of the first threshold, so the "Reactor coolant system" block merely remains with the first highlighting format (double-crosshatching, e.g. red). The ECCS is brought online responsive to violation of the second pressure threshold, and this is indicated in FIG. 5 by coloring the "Emergency Core Cooling" block with the second highlighting effect (single crosshatching, e.g. green). Again, in an alternative embodiment, the third highlighting (wide single-crosshatching, e.g. yellow) could instead be used since the ECCS is performing a remedial action in accordance with its intended operation. Additionally, a new solid connecting arrow is added, running from the "Reactor coolant system" block to the "Emergency Core Cooling" block. This solid arrow indicates activation of another heat sinking pathway: Nuclear core→RCS→ECCS→UHS. Note that the illustrative home screen does not include a functional block representing the UHS (i.e. ultimate heat sink). However, it is contemplated to include such a functional block, in which case a further solid connecting arrow would suitably run from the "Emergency Core Cooling" block to the UHS block.

In the illustrative example, the auxiliary condenser remains online after the ECCS is brought online, and so the solid connecting arrows indicating the heat sinking path involving the auxiliary condenser remain in FIG. 5. Alternatively, if the auxiliary condenser is taken offline concurrently with bringing the ECCS online, then these arrows for the auxiliary condenser heat sinking path would be turned off in FIG. 5.

The sequence of FIGS. 2-5 illustrates how the home screen provides the OATC with a rapid and accurate assessment of the root cause of the problem and its consequences.

Figure 6:
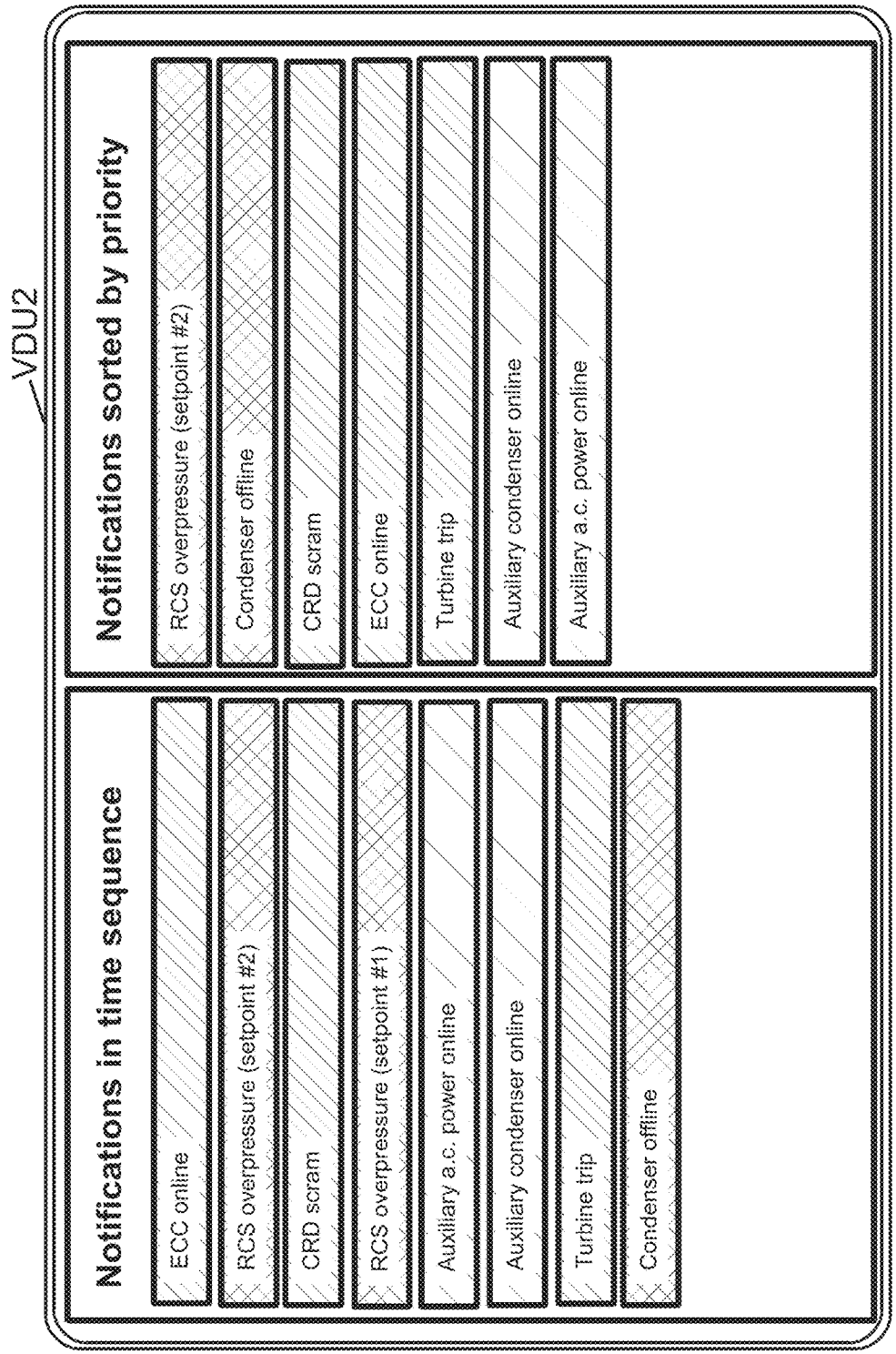
FIG. 6 shows the alarm register displayed on VDU1 of FIG. 1 concurrently with the home screen shown in FIG. 5.

With reference to FIG. 6, the alarm register display on VDU1 is shown for the system in the state shown in FIG. 5. In other words, the alarm register display of FIG. 6 is displayed on VDU1 concurrently with the display of the home screen of FIG. 5 on VDU5. The illustrative alarm register includes two sortable alarms lists: the list in the left window shows alarms listed in reverse chronological order, that is, by reverse time sequence (with the most recent alarm on top; alternatively, the list can be in chronological order, i.e. with the oldest alarm on top) The list in the right window shows the alarms ordered by priority. The alarm register uses the same highlighting formats as are used in the home screen. Thus, for example, the alarm indicating the condenser is offline is in the first highlight format, e.g. in red color, as this is the highest priority alarm. The alarm indicating turbine trip is in the second highlight format, e.g. in green color. The alarm indicating auxiliary condenser online is in the third highlight format, e.g. in yellow color. And so forth. The (left-hand) list in reverse chronological order is advantageous in tracing the sequence of events, while the (right-hand) list sorted by priority allows the OATC to identify the most urgent alarms. To assist in tracing the alarm history it is contemplated to label the alarms by time-of-occurrence in the left hand reverse chronological view (time stamps not shown in FIG. 6). It is noted that the (left-hand) list in chronological order includes two RCS overpressure alarms—the first occurred when the RCS pressure exceeded the lower first threshold (triggering scram), and the second occurred when the RCS pressure exceeded the higher second threshold (triggering placement of the ECCS online). In the (right-hand) list by priority, only the second alarm (RCS pressure exceeding the second threshold) is listed, since this alarm subsumes the alarm for RCS pressure exceeding the first threshold. In some embodiments, alarms are removed from the (right-hand) priority list when the underlying condition is remediated. It will be appreciated that the order of the lists can be reversed, i.e. the priority list can be on the left and the chronologically ordered list on the right. It is also contemplated to provide operator controls (not shown) to allow the OATC to sort the alarms shown in the right-hand window by various sorting criteria.

VDU1 has its screen split vertically into two alarm registries which display the same information, but in different formats. The left side of the display shows alarms chronologically organized, e.g. listed in reverse chronological order with the most recent alarm on top, and optionally including time-stamps. In this example, sorting, filtering, and other visual manipulations disabled in the left hand window, so that the OATC must view all alarms. The right side of the display shows alarms sorted by priority, with the highest priority alarms at the top. Optionally, the OATC has the ability to sort, filter, or re-arrange alarms in the right-hand window in order to display meaningful data to the current task.

Figure 7:
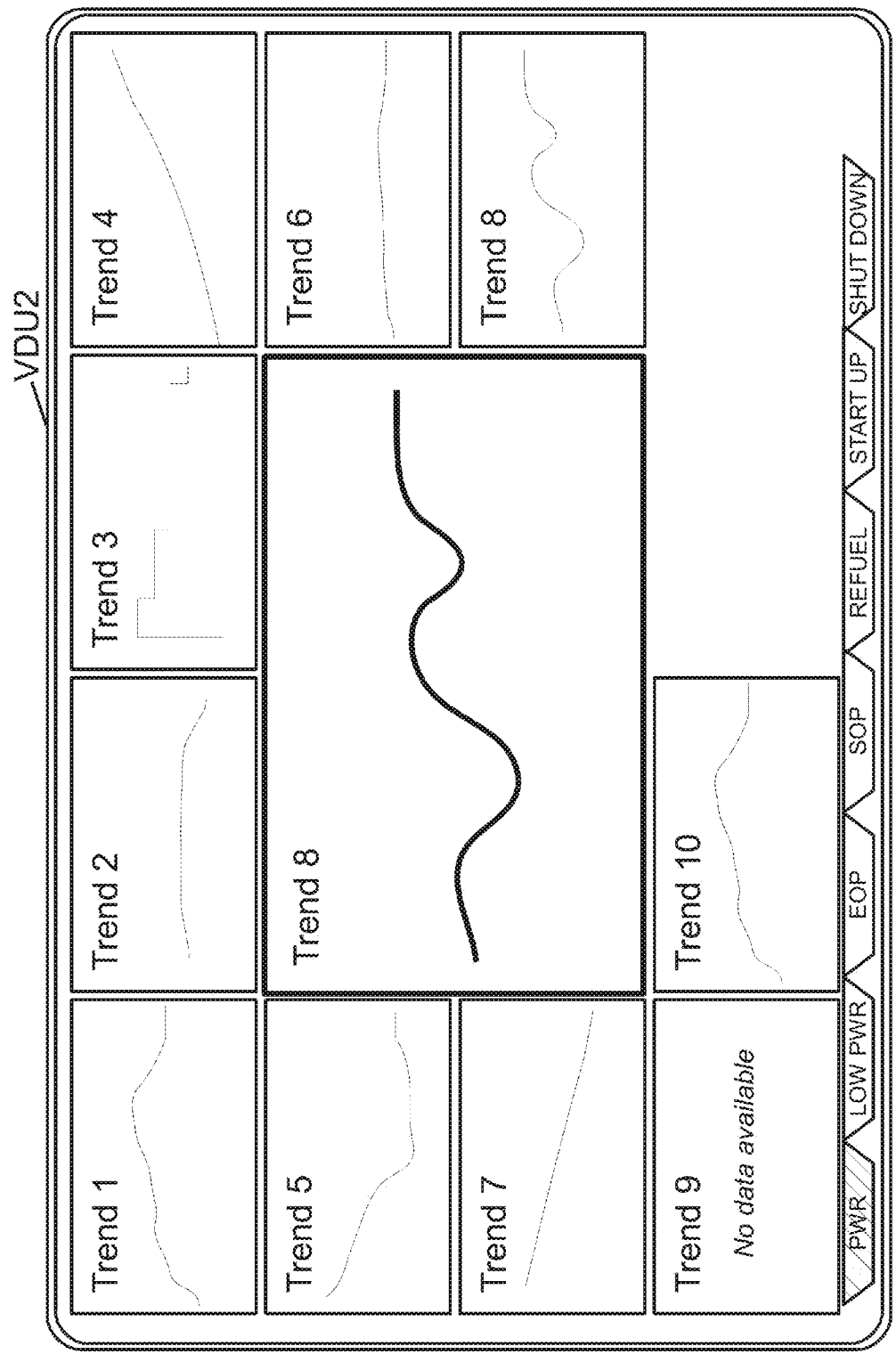
FIG. 7 diagrammatically shows a multi-trend display suitably shown on VDU2 of FIG. 1.

With reference to FIG. 7, an illustrative configuration for the multi-trend display on VDU2 is shown. The illustrative configuration employs "hidden" windows that are operator-selectable using selection tabs at the bottom of the view (suitably selected by touch if VDU2 is a touch-sensitive screen, or using a mouse pointer, or so forth). The illustrative selection tabs include: "PWR"; "LOW PWR"; "EOP"; "SOP"; "REFUEL"; "START-UP"; and "SHUT-DOWN". Additional or other tabs are also contemplated for different situations. The illustrative multi-trend view includes a relatively larger central window surrounded by relatively smaller peripheral windows. For each view (corresponding to a selected tab) the trends displayed in the various peripheral windows are in a fixed arrangement. Thus, in the illustrative example, the "PWR" tab is selected and "Trend 4" is displayed in the upper right peripheral window. This is then done consistently—in the "PWR" view the upper right peripheral window always displays "Trend 4", and the operator cannot reorder the peripheral windows (e.g., using a drag-and-drop process). In this way, it is ensured that for a given tab (e.g. the "PWR" tab) the OATC always sees the same arrangement of trends in the multi-trend display on VDU2. In this way, the OATC can gain familiarity with this layout and, with experience, immediately knows that the upper right peripheral window is displaying "Trend 4". The relatively larger central window, on the other hand, displays an operator-selected trend. For example, at the instant shown in FIG. 7 the larger central window is displaying "Trend 8". Selection of the view to display in the central window is suitably done by touch (for a touch-screen) or mouse selection of the peripheral view. Thus, by clicking the mouse cursor on the peripheral window showing "Trend 8" the OATC can display "Trend 8" in the central window (as shown). This allows the OATC to select a particular trend for inspection in the central window, while still seeing all of the other trends of that view in the peripheral windows. Note that in order to maintain the fixed pattern of peripheral windows, if no data is available for a given trend the corresponding peripheral window continues to be dedicated to that unavailable trend, as is the illustrative case for "Trend 9" in the lower left peripheral window of FIG. 7.

In the illustrative example of FIG. 7, VDU2 can show up to twelve real-time graphs in the peripheral window based on the current plant state (additional or alternative to being based on an OATC-selected tab as in FIG. 7; also note that in the view shown in FIG. 7 only ten of the possible twelve peripheral windows are being used to show trends with the bottom rightmost two available peripheral window slots being unused in the illustrative "PWR" view). Graphs are arranged around the perimeter of the screen with a blank center area, and the OATC can select a graph to display in the center blank area. When a graph is displayed in the center, it is enlarged (while maintaining the aspect ratio) to enhance visibility for the operator Graphs may contain one or more trends. Each graph can zoom, pan, pause, display historical data, or so forth. The OATC optionally may choose to 'stack' multiple graphs in the center area, and stacked graphs are aligned by the x-axis (time) so that trends may be compared with respect to time. Tabs or buttons are optionally displayed horizontally across the bottom of the screen (as per FIG. 7) to display the trends relative to that plant state. The multi-trend display suitably defaults to the tab that corresponds with the current plant state and display the graphs associated with that tab.

VDU3 shows a system mimic display. This display provides low-level control (e.g. of individual valves, switches, or so forth) for a given system. VDU3 employs "hidden" windows insofar as the OATC can select the system whose mimic is displayed. In some embodiments, this can be done by touching (or mouse-clicking) the corresponding system block in the home view of VDU5—for example, touching or mouse-clicking the "Turbine" block brings up a turbine control mimic on VDU3. To access lower-level components (e.g. a particular part of the turbine 26) a drill-down approach can be performed on VDU3, e.g. by clicking on a part of the turbine mimic an enlarged view of the selected area is shown. Other known graphical user interface (GUI) navigation techniques can additionally or alternatively be employed, such as having a set of tabs for different components.

Figure 8:
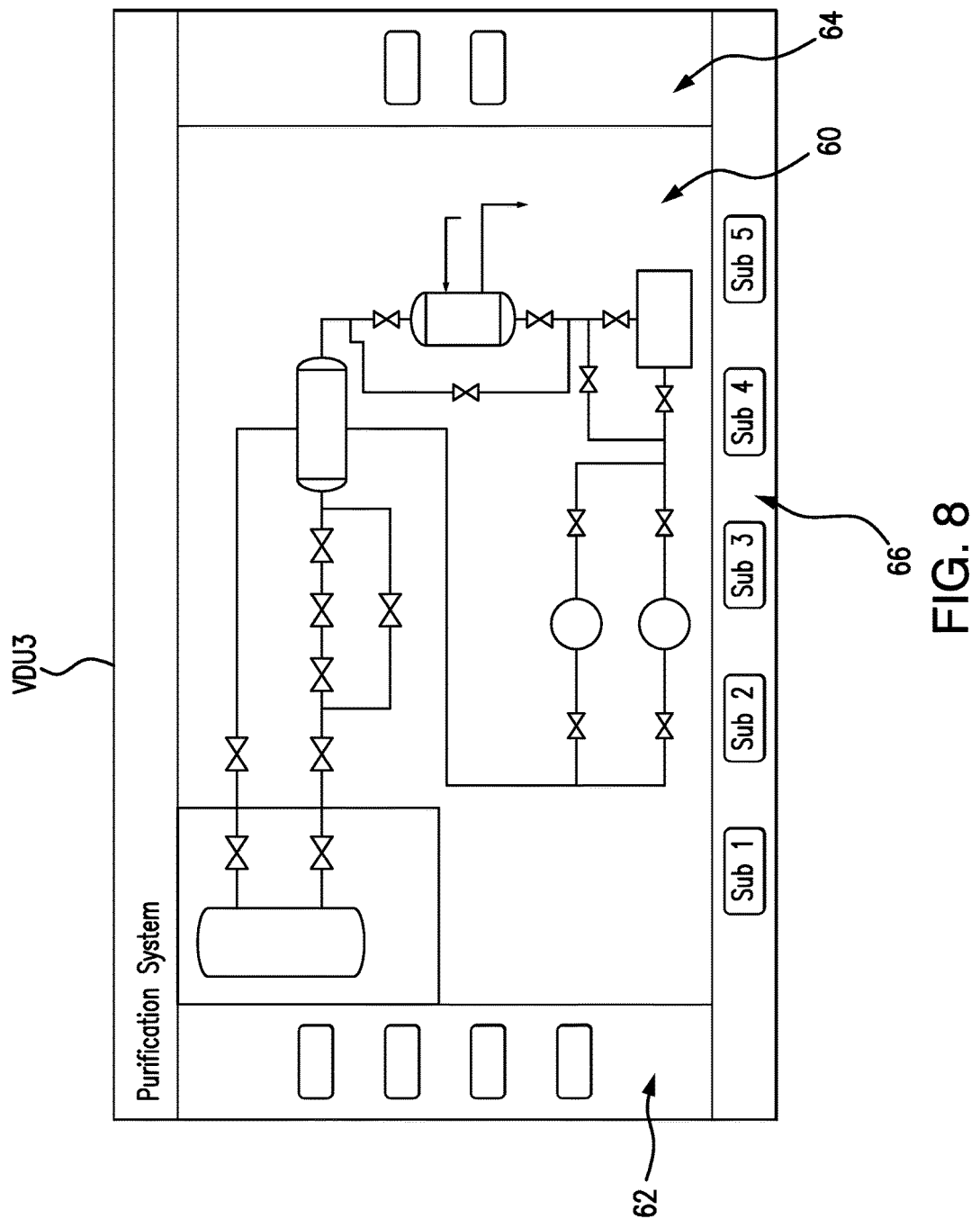
FIG. 8 diagrammatically shows a mimic display suitably shown on VDU3 of FIG. 1.

With reference to FIG. 8, an illustrative embodiment of VDU3, which displays the system mimic, is shown. This screen displays a mimic 60 of a current system (selected by the operator) in a simplified form. Mimics suitably consist of components such as piping, valves, pumps, heat exchangers, tanks, et cetera. Graphical components of a mimic are suitably drawn in diagrammatic form and extraneous information removed to increase salience of mission critical components. In one suitable configuration, the current system mimic is displayed in the center of the screen with narrow columns 62, 64 on far left side and right side, respectively, for navigation to interfacing systems, and navigation aids are displayed in color corresponding to the current system state. In some embodiments, a narrow row across the bottom of the screen contains navigation aids 66 to sub-systems that support the current system. These sub-system mimics provide more detailed information about a specific component or section of the mimic.

VDU4 displays provides an interface via which the OATC can select to run various pre-defined procedures stored in the procedures database 54. Each procedure has a defined operational space of primary coolant pressure, valve settings, and so forth within which the procedure is allowed to run, and VDU4 preferably displays only that sub-set of procedures that are allowed to run for the current state of the nuclear power plant. In some embodiments, the list of procedures may be further refined by selecting a particular system by touching or mouse-clicking the block representing that system in the home view shown in VDU5. Other known GUI navigation techniques can additionally or alternatively be employed to select the procedure. In some embodiments VDU3 and VDU4 operate in concert, in that a given procedure that is running may stop to request that the OATC perform some low-level operation using VDU3. In such a case the executing procedure causes VDU3 to display the appropriate mimic via which the OATC can perform the low-level operation. Conversely, the procedure running on VDU4 may interlock VDU3 so that the OATC cannot perform a dangerous low-level operation via VDU3 during the procedure.

Figure 9:
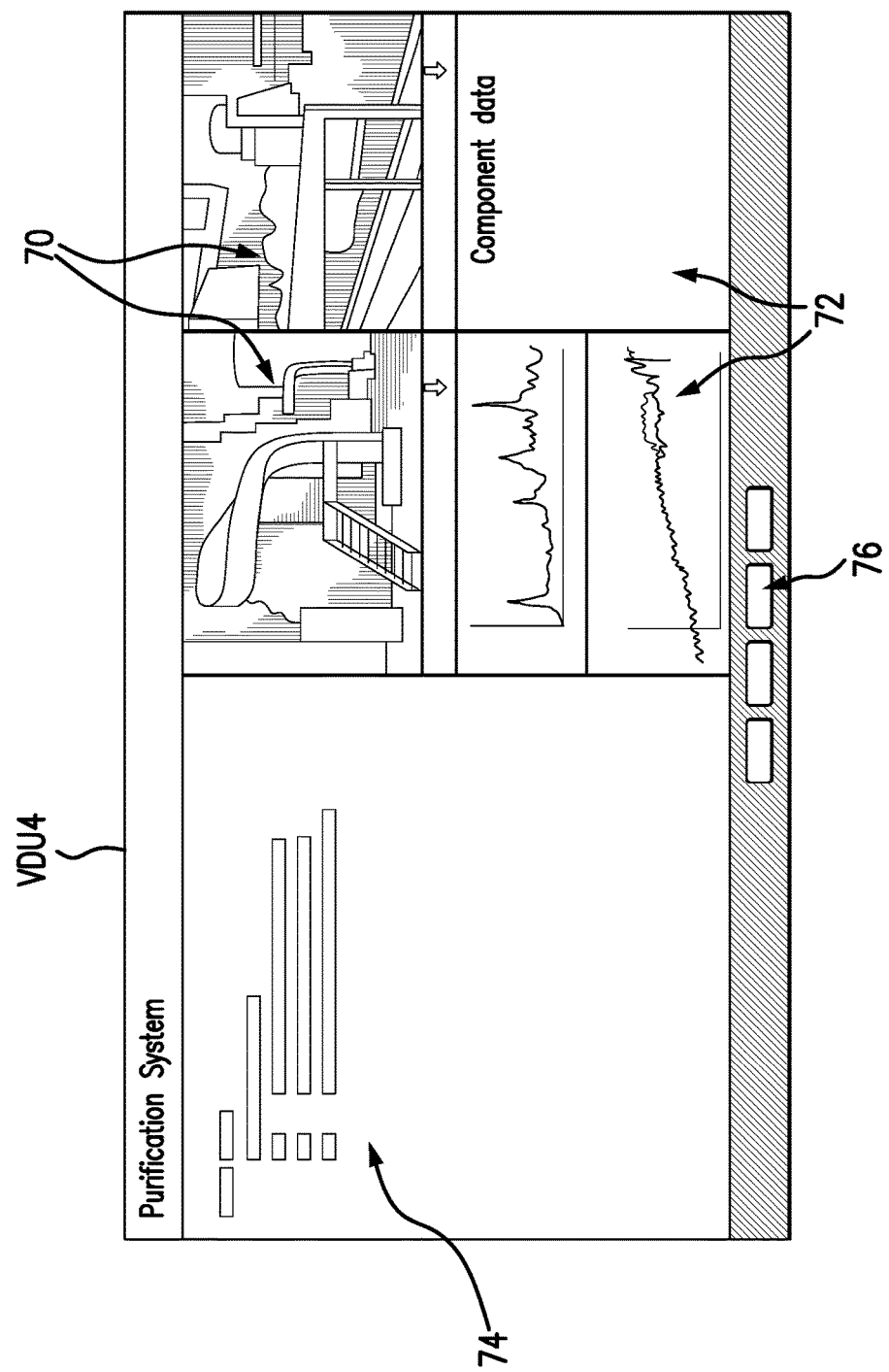
FIG. 9 diagrammatically shows a components/procedure display suitably shown on VDU4 of FIG. 1.

With reference to FIG. 9, an illustrative embodiment of VDU4, which presents the components/procedures display, is shown. In this embodiment, the components/procedures display area is divided into three main sections: (1) a live video feed 70; (2) component data 72; and (3) computer-based procedure 74.

The live video feed 70 is, in the illustrative embodiment of FIG. 9, located in the top right corner; and displays two live video feeds for the current system selected (other numbers of live video feeds are also contemplated, e.g. one feed, two feeds, three feeds, et cetera, and the number may be selectable by the OATC, who also has controls for audio, video, play, pause, rewind, rotate, tilt, zoom).

The component data section 72 is suitably in the bottom right corner, and displays live data values for a selected component. Tabs 76 may be displayed horizontally across the bottom allow the OATC to select a different component and its associated data. Vertical tabs (not shown) inside the component live data view allow the OATC to select either a tabular display of live data values or live data trends. Vertical tabs aligned to the right of the data display allow the OATC to select either a tabular display of live data values, live data trends, or a component tag task. Optionally, the component data section also allows the OATC to electronically tag or untag components from this tag tab for tag-out, tag-caution, tag-test, and tag-maintenance. For example, when a component is tagged out, it is deemed unavailable by the control room. (For safety, such electronic tagging should be accompanied by physical tagging of the actual component. Also, to ensure accuracy, the tagging options are only displayed for the current component state).

The computer-based procedure section 74 in the illustrative embodiment of FIG. 9 occupies the entire left side of the screen. A title at the top of the screen designates the currently selected system, and applicable tasks are listed for the current state of the system. The OATC can select a task to perform and view the task steps required. All task steps are disabled until the OATC acknowledges the component associated with the current step on the system mimic screen shown on VDU3 (e.g. FIG. 10) by touching or mouse-clicking on the component in VDU3. After acknowledgement, the task step is enabled and performed. The process is repeated with each step thereafter. The OATC has the option of reverting to the previous stable condition of the system once a task has been selected or begun. The OATC can also "auto-complete" a task in the event that attention is needed elsewhere. When a task is completed, the list of available system tasks reflects the new current state of the system. In another contemplated option, the OATC can touch or mouse-click a component in the system mimic screen of VDU3 to filter the task list for only those which involve the selected component.

The home screen shown in VDU5 has been described with reference to FIGS. 2-5, and provides high level indications of the plant status (except balance-of-plant systems). Each system is represented as a rounded rectangle or other diagrammatic block and is arranged on the home screen according to the functional relationships with other blocks. The functional system blocks indicate the state of the system through color coding, e.g. gray to indicate steady state, red to indicate alarm (i.e., the first highlighting format of the example of FIGS. 3-5), yellow to indicate caution (i.e. the third highlighting format of the example of FIGS. 3-5), and green to indicate expected responses (i.e. the second highlighting format of FIGS. 3-5). Relationships between the systems are designated by arrows, with arrowheads designating the direction of the relationship between the two systems connected (that is, input versus output). Input and output functional relationships between the systems are determined based on the state of the plant and vary as the plant state changes. While the example of FIGS. 2-5 employs textual labels for the blocks, in another embodiment each system block is labeled with a three letter acronym for the system. System blocks provide navigation by a touch or mouse-click for the OATC to quickly view the system-level mimic on the system mimic screen of VDU3.

Navigation links are provided between home screen (VDU1), computer based Procedures screen (VDU4), and the system mimic screen (VDU3). The home screen (VDU5) is used as a primary starting point for system-system navigation and provides the corresponding system mimic on the system mimic screen (VDU3) and the applicable procedures and component data on the computer-based procedure screen (VDU4). In some embodiments, the computer-based procedure screen (VDU4) is an end-point navigation path (i.e., no navigation paths out of VDU4 are provided in the human-machine interface (HMI) design, only paths that drive information to be displayed on VDU4). The system mimic screen (VDU3) functions as a two-way navigation path from system-to-system as well as system-to-subsystem. The sortable alarm register screen (VDU1) and the multi-trend screen (VDU2) are each independent and provide no navigation to any other screen. System mimics (VDU3) reflect the actual response of the system or component from the action performed by the OATC. Control feedback that does not comply with the expected response of the component/system is indicated through an alarm/warning condition on VDU1 and VDU5.

In further regard to navigation, and with brief returning reference to FIGS. 2-5, it will be noted that all functional blocks are shown in all illustrative home views of FIGS. 2-5. This is true even when the system corresponding to a functional block is not operative, e.g. the "Switchyard" block represents the electrical switchyard which is offline for the examples of FIGS. 3-5—nonetheless, the "Switchyard" block remains displayed (albeit with no connecting arrows). This is done because the home view is also a system selection tool. In the foregoing example, although the switchyard is offline, the OATC might want to view certain information about the switchyard, and can select to do so by touching or mouse-clicking the "Switchyard" block.

Various sequential action guidance approaches are contemplated. Auto-complete can be used when the current task needs to be completed, but another task takes higher priority for the attention of the OATC. Preferably, each task provides an option for the OATC to "undo" the task steps completed at any point and return the system to the previous safe/stable state. The OATC also has the option of assuming manual control of a component through the component faceplate control in the system mimic screen (VDU3). Computer-based procedures are displayed on computer based procedure screen (VDU4), and control is directly driven from the computer based procedures. The available procedures are stored in the procedures database 54 (see FIG. 1), and only applicable procedures for the current selected system are displayed for the current plant mode and system status. A list of procedure titles is displayed as links to navigate to the procedure steps. The list of procedures is optionally filtered by touching of mouse-clicking on a component on the mimic screen (VDU3) to reduce procedure list to tasks that impact that component.

In a suitable embodiment of the procedures section of VDU4, all steps of a procedure are visible from the time the procedure is selected until it is completed. Each step is inactive until the previous step is completed. A procedure step is disabled and cannot be performed until the OATC acknowledges the component receiving the action by touching or mouse-clicking on the component in the system mimic VDU3 (to improve situational awareness). When a procedure step is enabled by clicking the component in the system mimic, a checkbox or other selection (e.g. an "OK" button) beside the step on VDU4 is activated and the OATC is able to "check" the box by touch or mouse-click and the action is performed. When a procedure is completed, the final procedure step is to return to the system task menu.

As already mentioned, only applicable procedures for the current selected system are displayed for the current plant mode and system status. A procedure is selected by touching or mouse-clicking on the procedure title, similar to selection of a hyperlink on a web page. When a procedure is completed, the list of available procedures will be updated to reflect the change in the system state from the previous procedure completion.

Because the number of VDUs is relatively small, e.g. 5-7 VDUs in some preferred embodiments, and 6 VDUs in the illustrative example, it is advantageous to accommodate the possibility that a VDU may malfunction and become inoperative. One approach is to have redundant VDUs on hand; however, it would take time to switch out a defective monitor with a new monitor, and this may be unacceptable.

Figure 10:
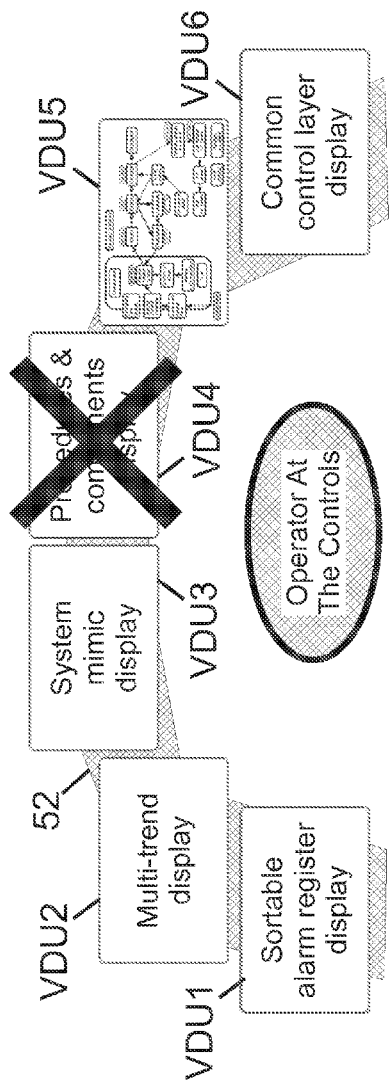
FIGS. 10 and 11 diagrammatically show an illustrative failure of VDU4 (FIG. 10) and a shifted display arrangement that compensates for the defective VDU4 (FIG. 11).
Figure 11:
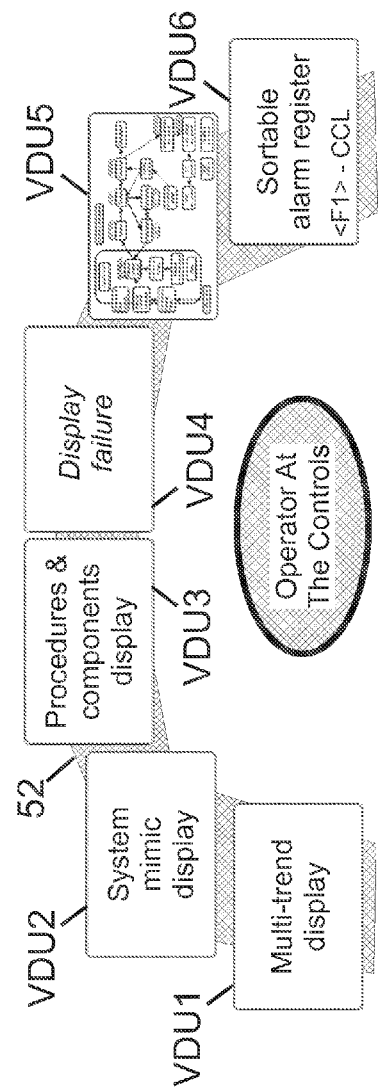

With reference to FIGS. 10 and 11, an approach for addressing an inoperative VDU is illustrated. In illustrative FIG. 10, VDU4 has failed (as indicated by the large "X" crossing out VDU4). VDU4 ordinarily displays the components/procedures display—its unavailability would be a serious problem. To resolve this problem, the functions of the various VDUs shift, as shown in FIG. 11. Thus, VDU3 which formerly displayed the mimic display now displays the components/procedures display. Similarly, VDU2 which formerly displayed the multi-trend display now displays the mimic view. VDU1 which formerly displayed the alarms register now displays the multi-trend display.

This leaves the alarms register, which has effectively "shifted off the end". As seen in FIG. 11, this is accommodated by showing the alarms register on VDU6, which normally displays non-safety information or other "less important" information. To allow the OATC to still access that information, VDU6 also provides a command via which the OATC can temporarily switch VDU6 to show the non-safety information. In the illustrative example of FIG. 11, this is done by pressing the <F1> function key, and a suitable instruction is shown at the bottom of the alarms register displayed on VDU6 in FIG. 11. Because displaying the alarms register is generally more important than displaying the non-safety information, VDU6 is preferably programmed to "time out" the display of the non-safety information and return to the alarm register display if the OATC does not interact with the non-safety display for a certain time interval. By way of illustrative example, the time-out period may be one minute, i.e. when <F1> is pressed the non-safety screen replaces the alarms register on VDU6, and thereafter if no further action is taken VDU6 switches back to the alarm register display after one minute has passed.

The defective monitor VDU4 is shown in FIG. 11 displaying the message "Display failure". This (or a similarly informative) message is advantageously displayed on the defective VDU if the VDU is indeed capable of displaying a textual message. (Of course, if the defect of the defective VDU renders it incapable of displaying anything, then nothing is displayed on the defective VDU).

By the disclosed approach of shifting the VDU screens as per illustrative FIGS. 8 and 9, the OATC continues to see something close to the usual arrangement of screens, with the exception that the alarms register is now on the rightmost VDU and VDU4 is blank. This is advantageous since it reduces likelihood of operator confusion.

In order for the disclosed VDU shifting scheme to work, the VDUs should all have the user interfacing capability of the VDU with the most complex user interface. For example, VDU1 may not ordinarily need user input capability, since it ordinarily displays the alarms register (as in FIG. 8). However, when the VDU shift shown in FIG. 9 is executed, VDU1 then displays the mimic display, which does require user input (e.g., a touch screen, and/or a mouse, or so forth). Thus, all six VDUs should have the same user interfacing capacity, and indeed are preferably interchangeable.

In the illustrative example with six VDUs, failure of more than one VDU cannot be accommodated by the shifting scheme. However, if a seventh monitor (e.g., a second non-safety related monitor) is added then up to two defective monitors can be accommodated. If an eighth monitor is added then up to three defective monitors can be accommodated. In some embodiments, the total number of VDUs is between 5 and 8. Additionally, it is contemplated to include a large (e.g. wall-mounted) overview display that is visible to the shift supervisor and other personnel in the control room, and/or the shift supervisor may have an additional monitoring VDU via which the supervisor can monitor the OATC. Moreover, it is to be appreciated that while the illustrative embodiment includes six distinct VDUs, it is alternatively contemplated to employ a single large-aspect ratio VDU spanning the display area of the illustrative six VDUs, with the functionality of the six individual monitors being provided by six windows displayed on the large-aspect ratio monitor. Said another way, there does not need to be physical separation between the display areas of VDU1-VDU6.

The disclosed control room embodiments include a reactor control interface that includes the illustrative VDU1-VDU6 (or some other number of VDUs, e.g. in a range 5-8 VDUs) and a computer or other electronic data processing device (not shown) in communication with electronic data networks and with VDU1-VDU6 and programmed to generate the disclosed displays and to receive and process user inputs as described herein, and to send control signals to various components of the nuclear power plant (in accord with user inputs and/or in accord with automated procedures displayed on VDU4 and executed by the computer or other electronic data processing device). The computer or other electronic data processing device suitably includes or has access to a hard drive or other electronic storage medium that stores the procedures database 54 (see FIG. 1).

The computer or other electronic data processing device optionally comprises an interconnected plurality of computers or other electronic data processing devices. For example, in one contemplated embodiment each of VDU1-VDU6 comprises a desktop computer running software implementing the control room. In this approach, the six desktop computers (in the illustrative case of six VDUs) are interconnected via the electronic data network in order to perform intercommunication between the VDUs as described herein. For example, the desktop computer implementing VDU5 suitably communicates selection of a functional block to VDU3 and VDU4 and in response the desktop computers implementing those VDUs display the appropriate component mimic and procedures list, respectively. From the monitor shift example described with reference to FIGS. 10-11, it is apparent that the desktop computer normally implementing VDU3 (the system mimic) must also include software to implement VDU4 (the procedures/components display), and so forth for the other desktop computers. To achieve maximum redundancy in this embodiment, it is advantageous for each desktop computer to include the entirety of the control room software so that the monitor shift described with reference to FIGS. 10-11 can be performed. This also allows swap-out of desktop computers to permanently replace a defective VDU. Indeed, in one implementation of this approach, each desktop computer includes a VDU_type or other indicator as to which VDU the desktop computer implements, and the VDU shift of FIGS. 10-11 then amounts to updating the VDU_type values for the (illustrative six) desktop computers.

In another approach, the control room software executes on a central computer not particularly associated with any of VDU1-VDU6, and that central computer generates and transmits the displays to the six VDUs which in this embodiment are "dumb" terminals.

In either illustrative embodiment (i.e., the embodiment employing six interconnected desktop computers; or, the embodiment employing a central computer connected with six dumb terminals), the control room computer or interconnected computers are preferably connected with an electronic data network with suitable security provisions. For example, the electronic data network is preferably an isolated network that is connected with the various components of the nuclear power plant in order to receive alarm signals, send control signals, and so forth, but that is preferably not (at least directly) connected with the Internet or other wider area network. If required by the applicable nuclear regulatory agency, the electronic data network may be an entirely wired network; alternatively, if permissible under local nuclear regulations it is contemplated to employ a wireless network or a hybrid wired/wireless network.

The disclosed control room embodiments may also be embodied as a non-transitory storage medium storing instructions that are executable by the VDUs comprising a central computer controlling dumb terminals, or alternatively comprising a set of interconnected desktop computers, or alternatively comprising another suitable configuration of display devices and electronic data processing devices, to perform the disclosed control room operations including displaying the various screens (e.g. the home screen, alarms register display, et cetera) and receiving user inputs as described. The non-transitory storage medium may, for example, comprise a hard disk, RAID disk array, or other magnetic storage medium, an optical disk or other optical storage medium, a FLASH memory or other electronic storage medium, various combinations thereof, or so forth.

Still further, it is to be appreciated that various disclosed aspects of the illustrative embodiments can be implemented without other disclosed aspects. For example, the disclosed home screen of VDU5 may be implemented as described in the illustrative embodiments (or variants thereof) while the control interfacing may be implemented using techniques other than the disclosed operation of VDU3 and VDU4. Similarly, the disclosed home screen of VDU5 may be implemented as described in the illustrative embodiments (or variants thereof) while the alarm register and/or data trends are/is shown using a format different from that employed in described VDU1 and/or VDU2. As yet another example, the disclosed control room screens (i.e., VDU1-VDU6) can be implemented without the VDU-switching capability described with reference to FIGS. 10-11. Conversely, the VDU-switching capability described with reference to FIGS. 10-11 may be employed with a set of VDUs displaying control room subject matter formatted differently than that described for VDU1-VDU6.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

I claim:

1. A reactor control interface comprising:
    a home screen video display unit (VDU) configured to display:
        blocks representing functional components of a nuclear power plant including at least (i) blocks representing functional components of a normal heat sinking path of the nuclear power plant and (ii) blocks representing functional components of at least one remedial heat sinking path of the nuclear power plant, and
        connecting arrows of a first type that connect blocks that are providing a current heat sinking path, wherein directions of the connecting arrows of the first type represent the direction of heat flow along the current heat sinking path, and the connecting arrows of a first type are only displayed when the current heat sinking path is operational.

2. The reactor control interface of claim 1 wherein connecting arrows of the first type do not connect blocks that are not providing the current heat sinking path.

3. The reactor control interface of claim 2 wherein the home screen VDU is further configured to display connecting arrows of a second type visually distinguishable from the first type, the arrows of the second type connecting blocks.

4. The reactor control interface of claim 2 wherein the VDU is configured to update the displayed connecting arrows of the first type in response to the nuclear power plant switching from the normal heat sinking path to a remedial heat sinking path.

5. The reactor control interface of claim 1 wherein the blocks representing functional components of the normal heat sinking path include a block representing a reactor coolant system, a block representing a turbine, and a block representing a condenser.

6. The reactor control interface of claim 2 wherein the blocks representing functional components of the normal heat sinking path further include a block representing a steam system for conveying steam to the turbine.

7. The reactor control interface of claim 6 wherein the blocks representing functional components of the normal heat sinking path further include a block representing a feed water system for conveying feed water to a steam generator.

8. The reactor control interface of claim 1 wherein the VDU is configured to apply a first highlighting format to a block responsive to the functional component represented by that block transitioning to an abnormal condition that is the root cause of the nuclear power plant entering an abnormal operating condition.

9. The reactor control interface of claim 8 wherein the VDU is configured to apply a highlighting format different from the first highlighting format to a block responsive to the functional component represented by that block performing an intended remedial operation in response to the nuclear power plant entering the abnormal operating condition.

10. The reactor control interface of claim 7 wherein the VDU is configured to apply a highlighting format different from the first highlighting format to a block responsive to the functional component represented by that block transitioning to an abnormal condition that is not the root cause of the nuclear power plant entering an abnormal operating condition.

11. The reactor control interface of claim 1 wherein:
the VDU is configured to apply a highlighting format to a block responsive to the functional component represented by the block transitioning to an abnormal condition,
the applied highlighting format identifying that the functional component represented by the block is in an abnormal condition;
the applied highlighting format not identifying the abnormal condition.

12. The reactor control interface of claim 1 further comprising: a mimic VDU configured to display a mimic of a selected functional component responsive to a user input to the home screen VDU selecting a block displayed on the home screen VDU that represents the selected functional component.

13. The reactor control interface of claim 12 further comprising:
a procedures VDU configured to display a stored procedure.

14. The reactor control interface of claim 13 further comprising:
an electronic data processing device configured to execute the displayed stored procedure.

15. The reactor control interface of claim 14 wherein the electronic data processing device does not execute a step of the displayed stored procedure until a user input is received at the mimic VDU identifying a component that executes the step.

16. The reactor control interface of claim 13 further comprising:
a multi-trend VDU configured to display trends of one or more measured nuclear power plant parameters.

17. The reactor control interface of claim 16 wherein the multi-trend VDU displays a central window and peripheral windows surrounding the central window, wherein each peripheral window displays a trend dedicated to that peripheral window and the central window displays an enlarged view of one of the peripheral windows selected by user input to the multi-trend VDU.

18. The reactor control interface of claim 16 further comprising:
an alarms VDU configured to display a list of alarms generated by the nuclear power plant.

19. The reactor control interface of claim 18 further comprising:
an additional VDU;
wherein a group of safety VDUs includes the home screen VDU, the mimic VDU, the procedures VDU, the multi-trend VDU, and the alarms VDU but does not include the additional VDU; and
wherein responsive to a malfunctioning safety VDU, the displays of the safety VDUs that continue to function shift to free up one safety VDU to display content previously displayed on the malfunctioning safety VDU and a display that is removed from the group of safety VDUs by the shift is displayed on the additional VDU.

20. The reactor control interface of claim 1 further comprising:
an alarms VDU configured to display a left-hand window and a right-hand window with (1) a list of alarms generated by the nuclear power plant in chronological or reverse chronological order in one window (2) a list of alarms generated by the nuclear power plant in a user-selectable order in the other window.

21. The reactor control interface of claim 1 further comprising:
an alarms VDU configured to display a left-hand window and a right-hand window with (1) a list of alarms generated by the nuclear power plant in chronological or reverse chronological order in one window (2) a list of alarms ordered by priority in the other window.

22. The reactor control interface of claim 1 comprising a plurality of VDUs including the home screen VDUs, the number of VDUs being eight or less.

* * * * *